(12) United States Patent
Ishibashi

(10) Patent No.: US 12,330,556 B2
(45) Date of Patent: Jun. 17, 2025

(54) VEHICULAR ILLUMINATION PRESENTATION SYSTEM

(71) Applicant: Yazaki Corporation, Tokyo (JP)

(72) Inventor: Shuichi Ishibashi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 365 days.

(21) Appl. No.: 17/891,542

(22) Filed: Aug. 19, 2022

(65) Prior Publication Data

US 2023/0068814 A1 Mar. 2, 2023

(30) Foreign Application Priority Data

Aug. 25, 2021 (JP) ................. 2021-137527

(51) Int. Cl.
| | |
|---|---|
| B60Q 3/60 | (2017.01) |
| B60J 3/04 | (2006.01) |
| B60Q 3/70 | (2017.01) |
| G02F 1/01 | (2006.01) |

(52) U.S. Cl.
CPC .................. *B60Q 3/60* (2017.02); *B60J 3/04* (2013.01); *B60Q 3/70* (2017.02); *G02F 1/0121* (2013.01)

(58) Field of Classification Search
CPC .... B60Q 3/04; B60Q 3/60; B60Q 3/70; G02F 1/0121; B60J 3/04
USPC ................. 362/488, 489, 500, 503
See application file for complete search history.

(56) References Cited

U.S. PATENT DOCUMENTS

| | | |
|---|---|---|
| 2011/0025208 A1 | 2/2011 | Yamashita et al. |
| 2015/0261219 A1* | 9/2015 | Cuddihy ............. B60J 3/04 701/23 |
| 2018/0086260 A1 | 3/2018 | Barillot et al. |
| 2018/0099611 A1* | 4/2018 | Sugimoto ............. G07B 13/04 |
| 2019/0366811 A1* | 12/2019 | O'Keeffe ............. B60J 3/04 |
| 2020/0130573 A1 | 4/2020 | Ito |

FOREIGN PATENT DOCUMENTS

| | | |
|---|---|---|
| EP | 3 300 940 A1 | 4/2018 |
| JP | 2010-120415 A | 6/2010 |
| JP | 2011-25870 A | 2/2011 |
| JP | 2018-188055 A | 11/2018 |
| JP | 2020-69932 A | 5/2020 |
| WO | 2017/071911 A1 | 5/2017 |

* cited by examiner

Primary Examiner — Thomas M Sember
(74) Attorney, Agent, or Firm — Sughrue Mion, PLLC

(57) ABSTRACT

There is provided a vehicular illumination presentation system including: a first control system configured to control a vehicle interior illumination; a second control system configured to control a dimming unit located in a predetermined portion in a region surrounding a vehicle passenger compartment, the dimming unit being capable of adjusting a light transmittance; and a coordination control unit configured to coordinate an operation of the first control system and an operation of the second control system with each other. According to the vehicular illumination presentation system of the present disclosure, it is possible to form a comfortable private space and perform effective presentation without a need for an occupant to perform any special manual operation.

2 Claims, 6 Drawing Sheets

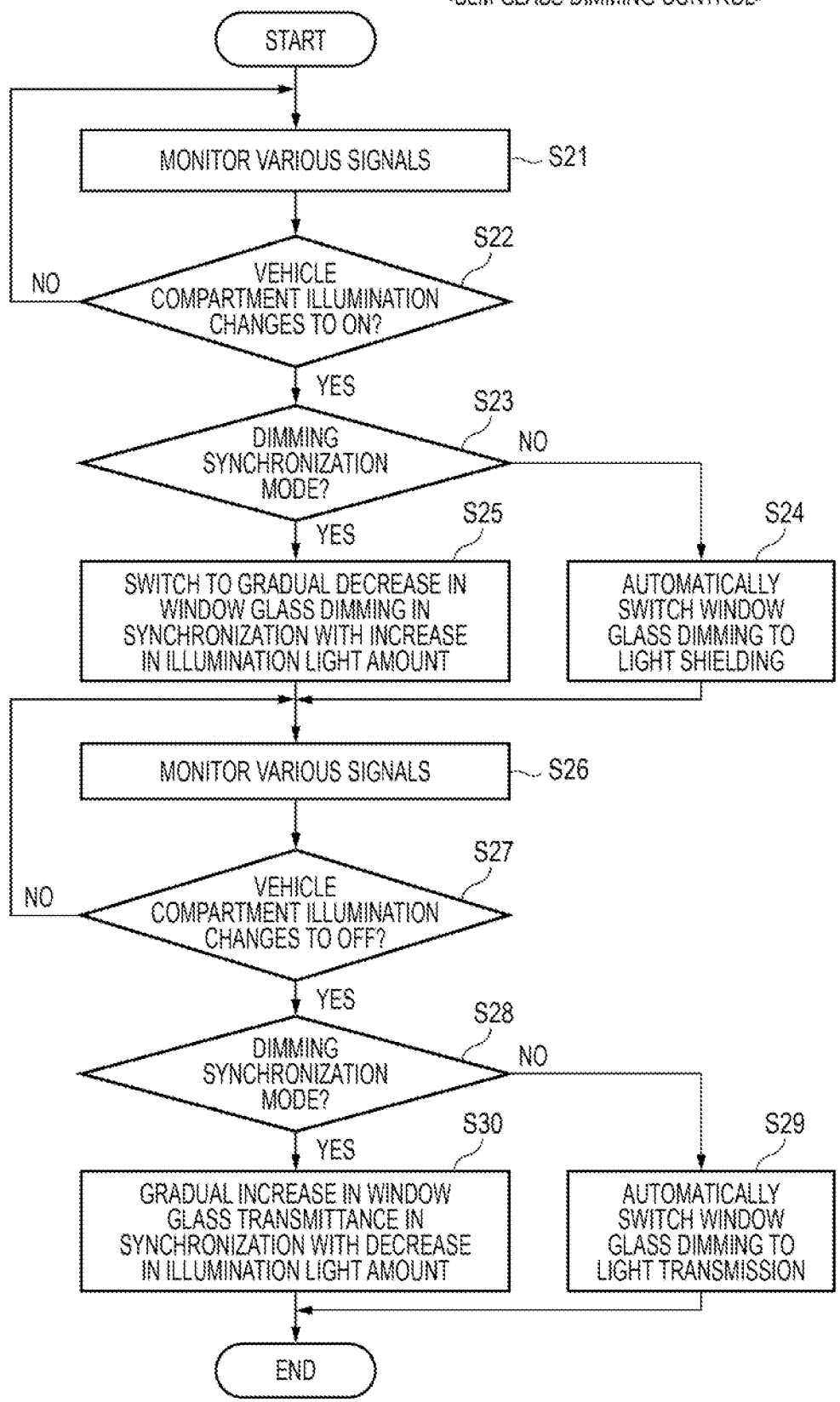

FIG. 6

<EXPLANATION OF REFERENCE SIGN>
A: VARIOUS ILLUMINATION SWITCH
B: DOOR OPEN/CLOSE SIGNAL (CTY)
C: UNLOCK SIGNAL (OPEN)
D: HEAD LIGHTING SIGNAL (TAIL)
E: ILLUMINANCE SENSOR DETECTION
F: INTRUSION/WATCHING SENSOR DETECTION
G: DIMMING CONTROL SWITCH (RH)
H: DIMMING CONTROL SWITCH (LH)
I: ILLUMINATION LIGHTING
J: DIMMING CONTROL FUNCTION

IDENTIFICATION MARK
○ : SW OPERATION, INPUT
● : SYSTEM COORDINATION
◐ : NO DEFAULT COORDINATION

| INPUT ITEM | | | | | | | | OUTPUT | | INPUT CONDITION ADDED |
|---|---|---|---|---|---|---|---|---|---|---|
| ILLUMINATION | | | OTHER SIGNALS/SENSOR | | | DIMMING CONTROL | | | | |
| A | B | C | D | E | F | G | H | I | J | |
| ○ |   |   |   |   |   |   |   | ○ | ◐ | WHEN ILLUMINANCE SENSOR DETERMINES "DARK" (CHANGE IN CUSTOMIZED SETTING) |
|   | ○ |   |   |   |   |   |   | ○ | ◐ | NO DEFAULT COORDINATION (COORDINATION IN CUSTOMIZED SETTING) |
|   |   | ○ |   |   |   |   |   | ○ | ◐ | NO DEFAULT COORDINATION (COORDINATION IN CUSTOMIZED SETTING) |
|   |   |   |   |   | □ |   |   | ○ | ● | OPERATE WHEN DETECTED MULTIPLE TIMES IN A CERTAIN PERIOD OF TIME (COUNTERMEASURES AGAINST FALSE DETECTION) |
|   |   |   | ○ |   |   | ○ | ○ | ◐ | ○ | WHEN ILLUMINANCE SENSOR DETERMINES "DARK" |
|   | ○ |   | ○ |   |   |   |   | ○ | ◐ | |
| ○ |   |   |   |   |   |   |   | ○ | ◐ | |

VEHICULAR ILLUMINATION PRESENTATION SYSTEM

CROSS-REFERENCE TO RELATED APPLICATIONS

This application is based on and claims priority under 35 USC 119 from Japanese. Patent Application No. 2021-137527 filed on Aug. 25, 2021, the contents of which are incorporated herein by reference.

TECHNICAL FIELD

The present disclosure relates to a vehicular illumination presentation system.

BACKGROUND ART

For example, a vehicular illumination device in JP2011-25870A involves a technique of turning on the light when a door is open and turning on the light when a user approaches a vehicle with one illumination operation. That is, when an on-board unit detects the approach of the user, a transistor switch is controlled to be turned on or off at a duty of 60%, and a dome lamp bulb is turned on at an illuminance of 60% for hospitality lighting. In the hospitality lighting, when a door open/close detection unit detects that the door is open, the transistor switch is constantly turned on (duty: 100%), and the dome lamp bulb is turned on by increasing the illuminance to 100%.

In addition, a dimming glass device in JP2010-120415A involves a technique of stopping the application of a voltage to a dimming glass when the dimming glass is broken. This dimming glass device includes an inverter that converts a DC voltage output from a battery mounted on the vehicle to an AC voltage, the dimming glass with a dimming film whose light transmittance changes when an AC voltage is applied, and a conductive unit that connects the battery with the inverter. A part of the conductive unit is a printed wiring part integrally provided by being printed on glass.

In recent years, attempts have been made to put automatic driving into practical use in automobiles, so there is an increasing need to enhance a function of a vehicle passenger compartment as a living space. For example, even when the vehicle is travelling, when it: is not necessary to see the scenery outside the vehicle from the vehicle passenger compartment, it my be desirable to isolate the vehicle passenger compartment from the outside of the vehicle passenger compartment as a private space for an occupant, Specifically, it may be necessary to use a curtain or the like to hide the occupant who is relaxing in the vehicle passenger compartment in a manner of not being seen by others outside the vehicle.

Further, when the surroundings are dark while the occupant is relaxing in the vehicle passenger compartment, for example, it may be necessary to turn on the light in the vehicle passenger compartment for reading or working. However, when the light in the vehicle passenger compartment is turned on while the surroundings are dark, the vehicle passenger compartment can be completely seen by others outside the vehicle through a window glass of the vehicle. Therefore, the occupant cannot use the vehicle passenger compartment as a private space unless he/she manually closes the curtain each time.

In the vehicle, special equipment such as the dimming glass shown in JP2010-120415A is mounted as standard equipment only in some luxury vehicles and high-grade vehicles, or it is highly likely that special equipment is amounted as an optional equipment at the request of the user. Therefore, a system such as a dimming glass is individually mounted on the vehicle in a state completely independent of a general system such as a vehicle interior illumination device.

Therefore, even in the case of a vehicle mounted with a dimming glass control system, whenever the vehicle passenger compartment is isolated from the outside as a private space by, shading the dimming glass, the occupant has to perform a special switch operation.

In addition, in order to correlate operations of, for example, a plurality of lower systems on the vehicle, when a host system control a plurality of lower systems independent of each other, a program for the host system must be rewritten. However, since the host system often performs a very complicated control, various difficulties are expected when modifying the program.

SUMMARY OF INVENTION

The present disclosure provides a vehicular illumination presentation system that can automate operations to form an appropriate private space in a vehicle passenger compartment or reduce required operations.

According to an illustrative aspect of the present application, a vehicular illumination presentation system includes: a first control system configured to control a vehicle interior illumination: a second control system configured to control a dimming unit located in a predetermined portion in a region surrounding a vehicle passenger compartment, the dimming unit being capable of adjusting a light transmittance; and a coordination control unit configured to coordinate an operation of the first control system and an operation of the second control system with each other.

The present disclosure has been briefly described above. Details of the present disclosure will be further clarified by reading a mode (hereinafter, referred to as "embodiment") for carrying out the present disclosure described below with reference to the accompanying drawings.

BRIEF DESCRIPTION OF DRAWINGS

FIG. 5 is a flowchart showing a characteristic operation of a master control unit in the illumination presentation system shown in FIG. 4.

FIG. 6 is a schematic diagram showing an example of a correspondence between inputs and outputs of a plurality of coordinating systems.

DESCRIPTION OF EMBODIMENTS

Specific embodiments related to the present disclosure will be described below with reference to the drawings.

First Embodiment

<System Configuration-1>

Figure 1:
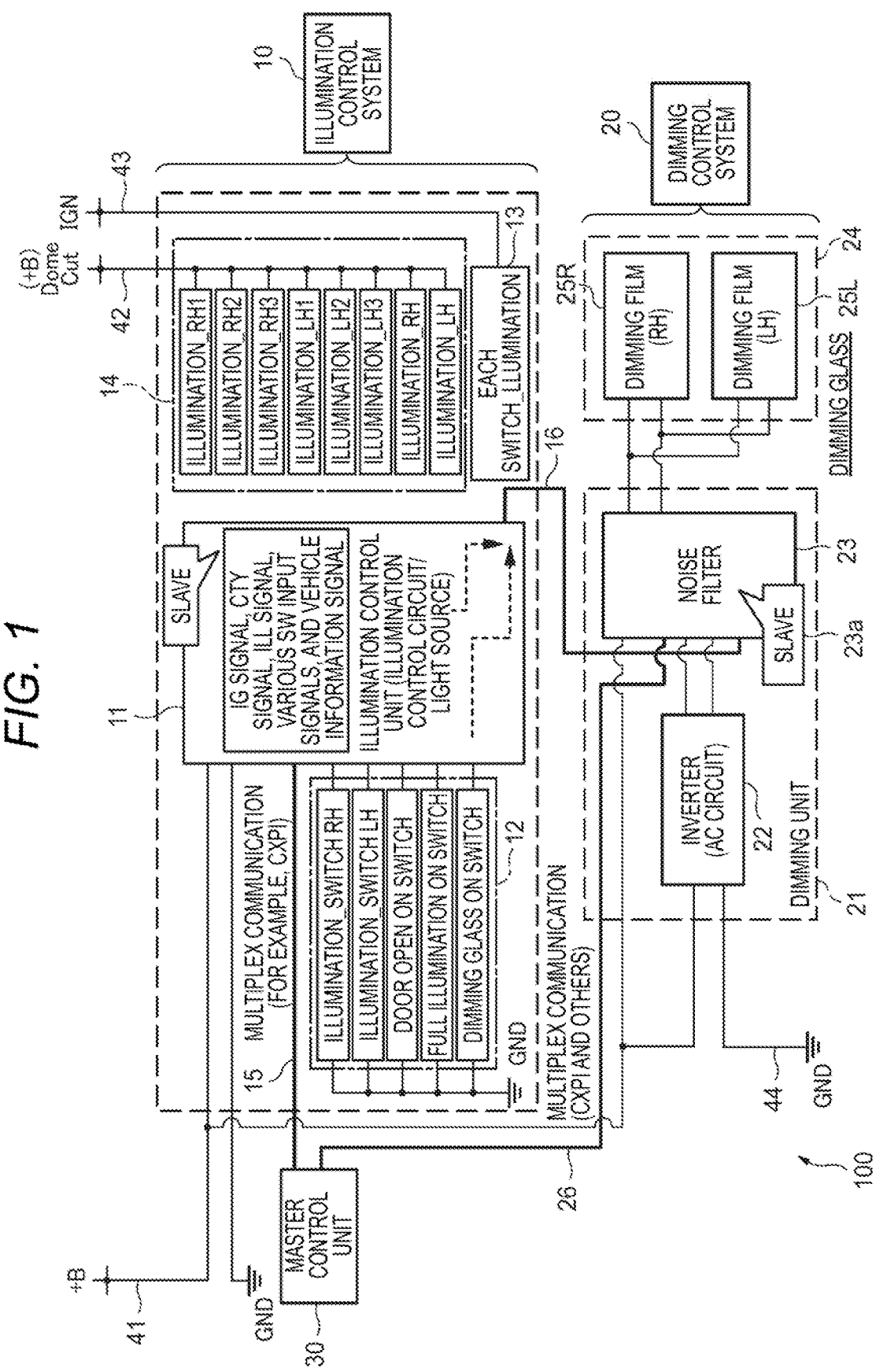
FIG. 1 is a block diagram showing a configuration example—1 of an illumination presentation system according to an embodiment of the present disclosure.

FIG. 1 shows a configuration example of an illumination presentation system 100 according to an embodiment of the present disclosure.

The illumination presentation system 100 shown in FIG. 1 has a function of coordinating an illumination control system 10 with a dimming control system 20, which are mounted on a vehicle. In addition, a master control unit 30 is provided as a control unit having a rank higher than that of the illumination control system 10 and the dimming control system 20, The master control unit 30 has a function (Body Control Module: BCM) of managing the entire body system of the vehicle.

A power supply, system of the illumination presentation system 100 is connected to power supply lines 41, 42, 43 on a vehicle side, and a ground (GNP) 44. The power supply line 41 supplies electric power (+B) output by an in-vehicle battery, the power supply line 42 supplies dome cut electric power that can be turned off after a lapse of a predetermined time by a timer or the like, and the power supply line 43 supplies electric power linked to on/off of an ignition (IG).

The illumination control system 10 shown in FIG. 1 is a unit installed on a ceiling portion of a vehicle passenger compartment as an overhead console (OHC), and is provided with a vehicle interior illumination function. The dimming control system 20 shown in FIG. 1 is a unit including a dimming glass 24 mounted on a window of left and right doors ofthe vehicle.

As shown in FIG. 1, the illumination control system 10 includes an illumination control unit 11, a switch unit 12, an illumination switch 13, and an illumination unit 14.

The illumination control unit 11 is connected to the master control unit 30 via a communication line 15 capable of multiplex communication (for example, Clock Extension Peripheral Interface; CXPI), and controls the illumination control system 10 as a slave of the master control unit 30. In addition, the switch unit 12 and the illumination Switch 13 are connected to an input side of the illumination control unit 11, and the illumination unit 14 and a coordination signal line 16 are connected to an output side of the illumination control unit 11.

The illumination control unit 11 controls an energization state of each unit of the illumination unit 14 according to states of various signals input from the switch unit 12 and the illumination switch 13 and instructions from the master control unit 30.

The illumination control unit 11 notifies the master control unit 30 of the states of the switch unit 12 and the illumination switch 13 by multiplex communication using the communication line 15. The illumination control unit 11 outputs a signal indicating a current control state in the illumination control system 10 to the coordination signal line 16.

The switch unit 12 includes an upper right position (RH) illumination switch, an upper left position (LH) illumination switch, a door open ON switch, a full illumination ON switch, and a dimming glass ON switch. The illumination switch 13 includes a plurality of switches assigned to the corresponding units for illumination.

The illumination unit 14 includes three illumination lamps (LEDs) on an upper right side, three illumination lamps on an upper left side, an illumination lamp (LED) on an upper right side, and an illumination lamp on an upper left side.

The illumination control unit 11 can individually control the on/off of each of the six illumination lamps included in the illumination unit 14. In addition, the illumination control unit 11 can control on/off emission intensity, emission color, and the like of the illumination lamps at the two locations.

The coordination signal line 16 connected to the output of the illumination control unit 11 is used to output a signal having, contents reflecting one or more control states of the illumination lamps of the illumination unit 14.

The illumination control unit 11 can handle an ignition signal, a door open/close (CTY) signal, a headlight (ILL or TAIL) signal, various operation switch signals, a vehicle information signal, and the like. In addition, information of these signals can be shared between the illumination control unit 11 and the master control unit 30 by multiplex communication via the communication line 15.

The dimming control system 20 includes a dimming unit 21. An inverter 22 and a noise filter 23 are provided inside the dimming unit 21. The noise filter 23 includes a slave control unit 23a.

The inverter 22 can generate AC power by switching a DC power supply power supplied from the power supply line 41. The noise filter 23 can generate an AC voltage having a waveform suitable fir driving dimming films 25R and 25L by removing a noise component from the AC power supplied from the output of the inverter 22.

The slave control unit 23a in the noise filter 23 is a logic circuit having a function of operating as a slave of the master control unit 30 by multiplex communication (for example, CXPI) via the communication line 26, The slave control unit 23a can switch on/off the AC voltage applied to the dimming films 25R and 25L, and adjust the applied AC voltage according to a situation.

In the configuration shown in FIG. 1, the slave control Unit 23a switches the AC voltage applied to the dimming films 25R and 251, based on a signal input from the output of the illumination control unit 11 of the illumination control system 10 via the coordination signal line 16 and an instruction from the master control unit 30 input via the communication line 26.

Each of the dimming films 25R and 25L is composed of a film-like dimming film whose light transmittance or light reflectance in a thickness direction can be electrically adjusted. The dimming film has a plurality of transparent electrodes, and the light transmittance or the light reflectance changes by applying a predetermined. AC voltage between the electrodes.

The dimming films 25R and 251, are disposed in a state of being on an inner side of the dimming glass 24 constituting the window glass of each door along the glass surface, or are installed in a state of being attached to an outer surface of the glass.

Therefore, by switching the AC voltage applied to the dimming films 25R and 251, by the dimming unit 21, the dimming glass 24 can be controlled to be in a light-shielding state or in a transparent state as needed.

In the illumination presentation system 100 shown in FIG. 1, as a characteristic function, it is possible to implement an operation in which the illumination control system 10 and the dimming control system 20, which are independent of each other, coordinate with each other, That is, since a signal reflecting the control state of the illumination control unit 11 is input to the noise filter 23 via the coordination signal line 16, the slave control unit 23a can perform a control to coordinate an illumination state in the vehicle passenger compartment in the illumination control system 10 with a dimming state of the dimming films 25R and 251

<System Operation-1>

Figure 2:
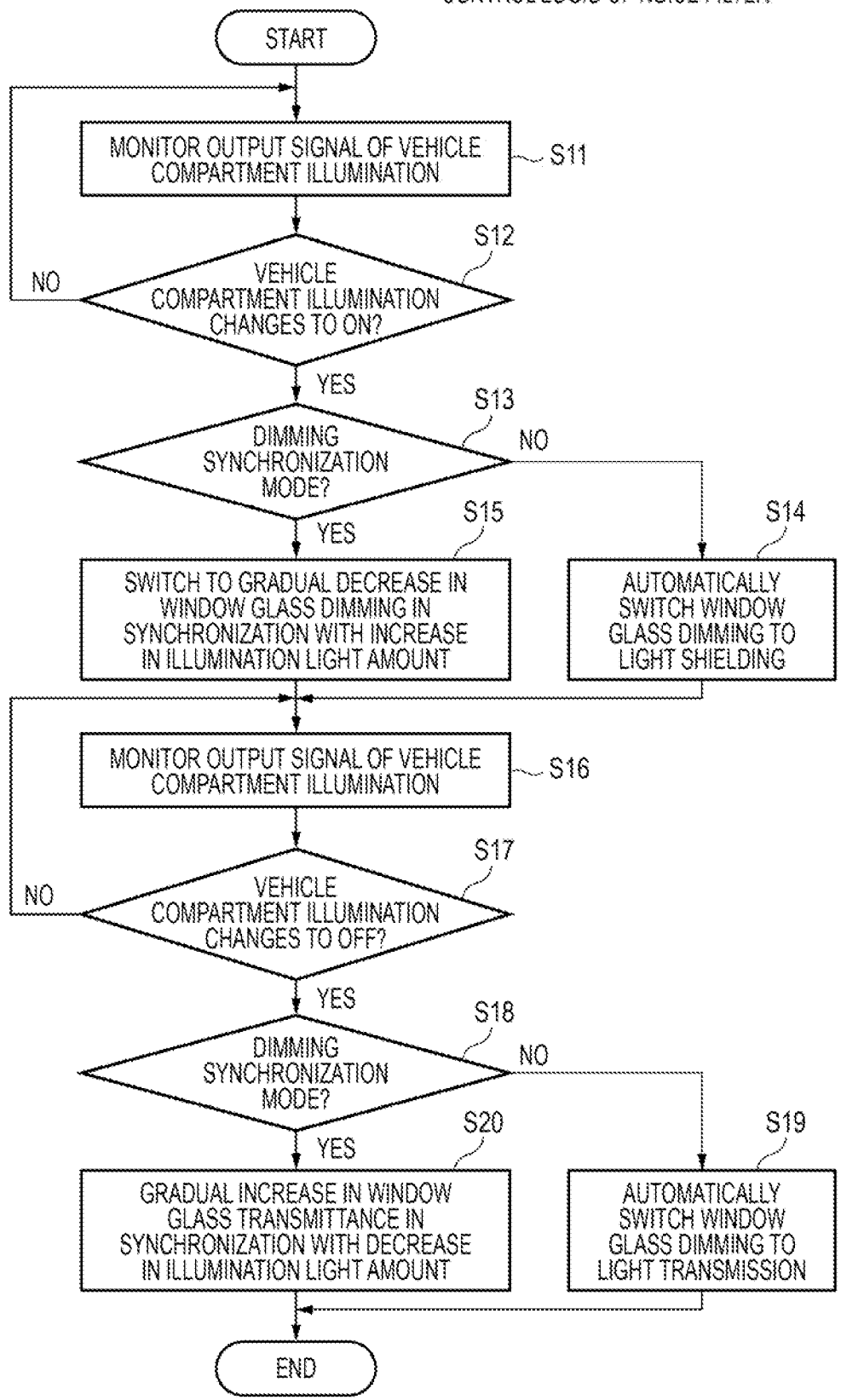
FIG. 2 is a flowchart showing a control logic of a noise filter in the illumination presentation system shown in FIG. 1.

FIG. 2 shows an outline of a control logic of the noise filter 23 in the illumination presentation system 100 shown in FIG. 1. That is, the slave control unit 23a in the noise filter 23 implements an operation shown in FIG. 2 as a characteristic function. The operation in FIG. 2 will be described below.

The slave control unit 23a grasps a state change of the illumination control on an illumination control system 10 side by monitoring a signal state of the coordination signal line 16 in S11. Then, when it is detected in S12 that the illumination in the illumination control system 10 has been switched from off to on, the process proceeds to S13.

For example, when a surrounding environment is dark and the illumination switch is turned on to turn on the vehicle interior illumination, there is a high possibility that the vehicle passenger compartment is completely visible from the outside because illumination light is sufficiently brighter than the surroundings. In order to prevent this, the slave control unit 23a performs a coordination control in S13 and subsequent processes. For example, when hospitality is provided by illumination accompanying the opening and closing of a door, the slave control unit 23a performs a coordination control in order to enable more effective presentation.

In the present embodiment, whether to use a dimming synchronization mode can be selected as needed. When the dimming synchronization mode is not needed, the slave control unit 23a proceeds from S13 to S14, and automatically switches the dimming films 25R and 25L to a light-shielding state in accordance with the switching of the vehicle interior illumination or the illumination to the on state.

For example, when the occupants hospitality is to be presented by using illumination, the slave control unit 23a selects the dimming synchronization mode. Then, when the dimming synchronization mode is needed, the slave control unit 23a proceeds from S13 to S15, and performs automatic switching, such that the light transmittance of each of the dimming films 25R and 25L gradually decreases (the light reflectance increases) in synchronization with an increase in light emission amount or illuminance of the vehicle interior illumination or the illumination.

The slave control unit 23a grasps the state change of the illumination control on the illumination control system 10 side by monitoring the signal state of the coordination signal line 16 in 516. Then, when it is detected in S17 that the illumination in the illumination control system 10 has been switched from on to off, the process proceeds to S18.

When the dimming synchronization mode is not needed, the slave control unit 23a proceeds from S18 to S19, and automatically switches the dimming films 25R and 251, to a light transmission state in accordance with the switching of the vehicle interior illumination or the to the off state.

Then, when the dimming synchronization mode is needed, the slave control unit 23a proceeds from S18 to S20, and performs automatic switching such that the light transmittance of each of the dimming films 25R and 25L gradually increases (the light reflectance decreases) in synchronization with a decrease in light emission amount or illuminance of the vehicle interior illumination or the illumination.

The dimming synchronization mode or the coordination between the illumination control system 10 and the dimming control system 20 can be appropriately switched according to a change in situation. For example, a change in brightness of the surrounding environment that can be detected by an illuminance sensor, a change in the on/off of the headlight, a change in opening and closing of the door, and the like can be reflected in the coordination control shown in FIG. 2,
<Operation Example>
FIG. 3 shows an operation example of the illumination presentation system 100 shown in FIG. 1, The operation shown in FIG. 3 corresponds to a case where the above dimming synchronization mode is needed.

Figure 3:
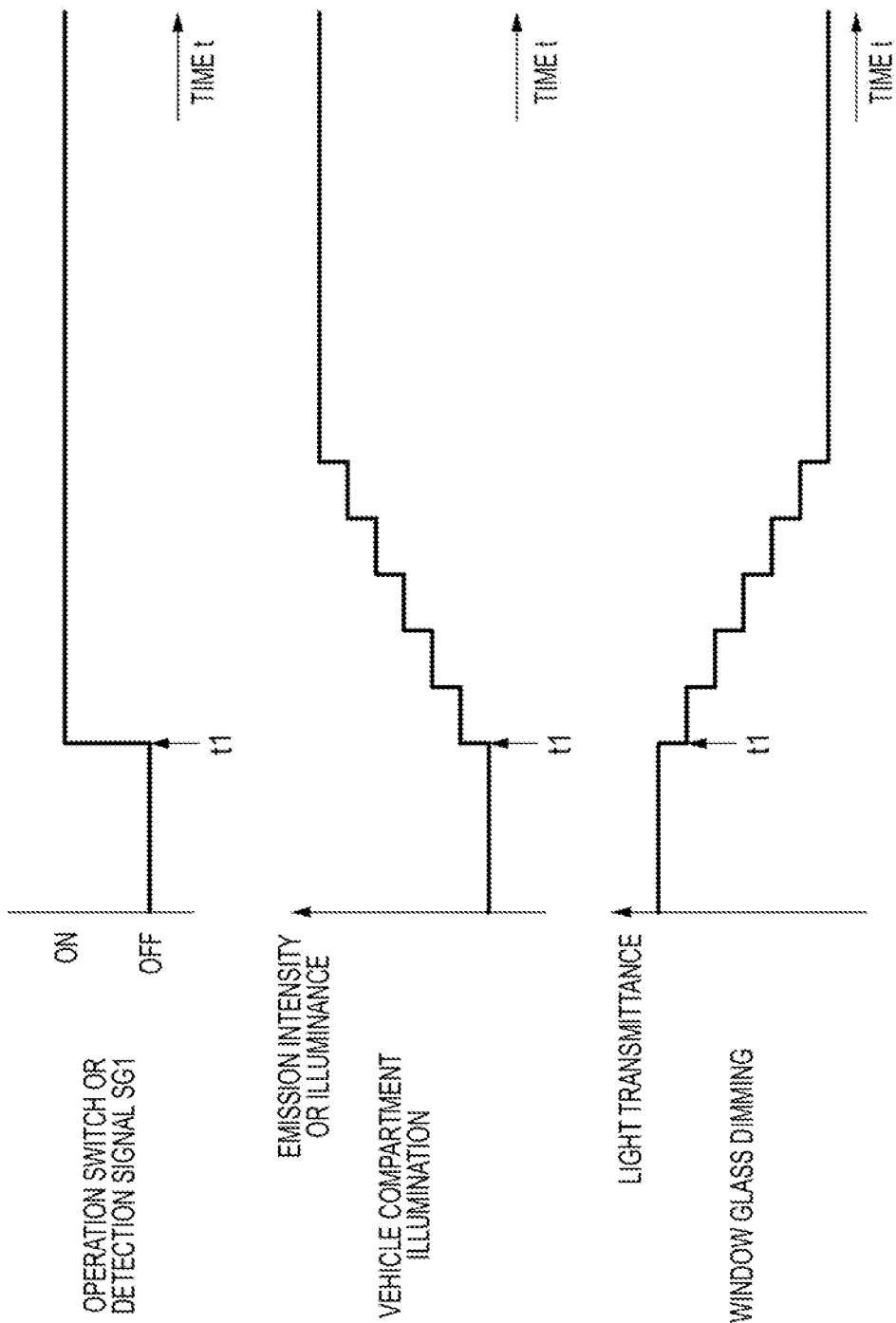
FIG. 3 is a time chart showing an operation example of the illumination presentation system shown in FIG. 1.

For example, when a signal SG1 output from any switch of the switch unit 12 switches front off to on at a time point t1 as shown in FIG. 3, the illumination control unit 11 in the illumination control system 10 controls the emission intensity of the illumination of the illumination unit 14 to gradually increase from the time point t1 according to the signal SG1. Since a signal indicating the same state as this illumination control appears in the coordination signal line 16, the slave control unit 23a of the dimming control system 20 performs a control to adjust the dimming of alae dimming films 25R and 25L such that the light transmittance of the dimming glass 24 gradually decreases in synchronization with the time point t1 according to the signal in the coordination signal line 16.

Therefore, the occupant in the vehicle can recognize that the light amount in the vehicle interior illumination and the light transmittance of the window glass are coordinated with each other and change at the same time. In the example in FIG. 3, it is assumed that only the light transmittance of the window glass and the light amount in the illumination are adjusted. Alternatively, the illumination may be presented by combining a change in emission color in the illumination and a change in illumination position.

Second Embodiment

Figure 4:
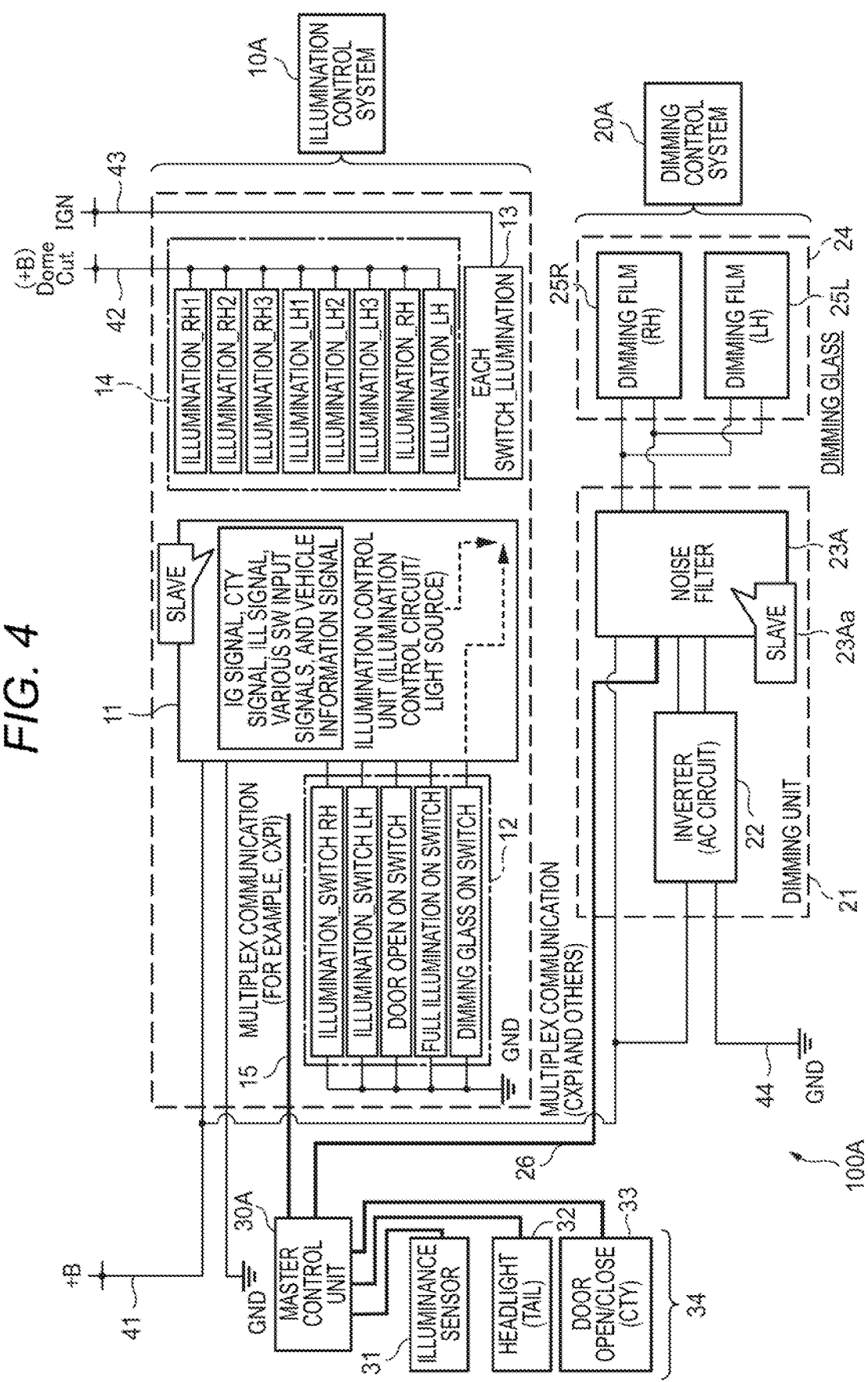
FIG. 4 is a block diagram showing a configuration example—2 of an illumination presentation system according to an embodiment of the present disclosure.

<System Configuration-2>
FIG. 4 shows a configuration example of an illumination presentation system 100A according to an embodiment of the present disclosure. The illumination presentation system 100A is a modification of the illumination presentation system 100 in FIG. 1. In FIG. 4, the same components as those in FIG. 1 are indicated by the same reference numerals.

The illumination presentation system 100A m Fi. 4 includes an illumination control system WA, a dimming control system 20A, and a master control unit 30A. The configuration and operation of the illumination control system 10A are the same as those of the illumination control system 10 in FIG. 1, except that the coordination signal line 16 shown in FIG. 1 is not present.

In the illumination presentation system 100A in FIG. 4, the master control unit 30A has a function for coordinating operations of the illumination control system 10A and the dimming control system 20A. In addition, the master control unit 30A gives an instruction for coordinating the operations of the illumination control system 10A and the dimming control system 20A to a slave control unit 23Aa of a noise filter 23A by multiplex communication via the communication line 26.

In the configuration shown in FIG. 4, an input device 34 including an illuminance sensor 31, a headlight switch 32, and a door switch 33 is connected to an input of the master control unit 30A. The illuminance sensor 31 can detect an illuminance in the environment outside the vehicle passenger compartment. The headlight switch 32 outputs a signal indicating on/off of the headlight lighting in the vehicle. The door switch 33 outputs a signal indicating the open/closed state of the vehicle door.

The slave control unit 23Aa of the dimming control system 20A performs a dimming control on the dimming films 25R and 25L according to an instruction from the master control unit 30A.

<System Operation-2>

FIG. 5 shows a characteristic operation of the master control unit 30A in the illumination presentation system 100A shown in FIG. 4. The operation in FIG. 5 will be described below.

In S21, the master control unit 30A monitors state information of the switch unit 12 transmitted from the illumination control unit: 11 and states of various signals input: from the input device 34 to grasp the change in situation. Then, when it is recognized in S22 that the vehicle interior illumination or the illumination under the control of the illumination control system 10A has been switched from off to on, the process proceeds from S22 to S23.

For example, when a surrounding environment is dark and the illumination switch of the switch unit 12 is turned on to turn on the vehicle interior illumination, there is a high possibility that the vehicle passenger compartment is completely visible from the outside because illumination light is sufficiently brighter than the surroundings. In order to prevent this, the master control unit 30A performs a coordination control in S23 and subsequent processes. For example, when hospitality is provided by illumination accompanying the opening and closing of a door, the master control unit 30A performs a coordination control in S23 and subsequent processes in order to enable more effective presentation. Further, for example, when the surrounding environment is bright, the illumination and other in-vehicle displays are difficult to see due to the influence of the external liht, and the occupant is easily influenced by a disturbance environment such as a fluctuation of external light intensity. In such a case, a "private space presentation mode" is set, and the master control unit 30A performs a coordination control in S23 and subsequent processes.

In the present embodiment, whether to use a dimming synchronization mode can be selected as needed. When the dimming synchronization mode is not needed, the master control unit 30A proceeds from S23 to S24, and automatically switches the dimming films 25R and 251, to a light-shielding state in accordance with the switching of the vehicle interior illumination or the illumination to the on state.

For example, when the occupant's hospitality is to be presented by using the master control unit 30A selects the CHM/ling synchronization mode. Then, when the dimming synchronization mode is needed, the master control unit 30A proceeds from S23 to S25, and performs automatic switching such that the light transmittance of each of the dimming films 25R and 25L gradually decreases in synchronization with an increase in light emission amount or illuminance of the vehicle interior illumination or the illumination.

In S26, the master control unit 30A monitors information of the switch transmitted from the illumination control unit 11 and states of signals input from the input device 34 to grasp the change in situation. Then, when it is detected in S27 that the illumination in the illumination control system 10A has been switched from off to on, the process proceeds to S28.

When the dimming synchronization mode is not needed, the master control unit 30A proceeds from S28 to S29, and automatically switches the dimming films 25R and 251, to a light transmission state in accordance with the switching of the vehicle interior illumination or the illumination to the off state.

When the dimming synchronization mode is needed, the master control unit 30A proceeds from S28 to S30, and performs automatic switching such that the light transmittance of each of the dimming films 25R and 251, gradually increases in synchronization with a decrease in light emission amount or illuminance of the vehicle interior illumination or the illumination.

The dimming synchronization mode or the coordination between the illumination control system 10A and the dimming control system 20A can be appropriately switched according to a change in situation. For example, a change in brightness of the surrounding environment that can be detected by the illuminance sensor 31, a change in the on/off of the headlight switch 32, a change in opening and closing detected b the floor switch 33, and the like can be reflected in the coordination control shown in FIG. 5.

<Specific Example of System Coordination>

FIG. 6 shows an example of a correspondence between a combination of various input conditions and a control output when a plurality of systems are coordinated with each other.

It is expected that, in an in-vehicle system including the illumination control system 10 and the dimming control system 20, as shown in FIG. 6, states of input items such as various illumination switches, a door open/close (CYT), a door unlock signal, a headlight lighting signal. (TAT an illuminance sensor detection state, intrusion/watching sensor detection state, a dimming control switch (RH, LH) are flexibly reflected in the control.

When the illumination control system 10 and the dimming control system 20 are coordinated with each other as in the illumination presentation systems 100 and 100A shown in FIG. 1 and FIG. 4, a plurality of combinations or one of the input items as shown in (1) to (7) below can be reflected in the coordination control.

(1) a combination of illumination switch and illuminance sensor (a dark case).

(2) a combination of door open/close and illuminance sensor.

(3) a combination of unlock and intrusion/watching.

(4) intrusion/watching state (when detected multiple times in a certain period of time: countermeasures against false detection).

(5) as combination of dimming control switch and illuminance sensor (a dark case).

(6) a combination of illumination switch, headlight lighting, and illuminance sensor.

(7) a combination of door open/close, headlight lighting, and illuminance sensor.

Further, in the illumination presentation system 100, a function for each vehicle user to customize the conditions in the coordination control according to his/her preference is provided. This makes it possible to flexibly respond to the needs of users.

In the above embodiment, it is assumed that the illumination control system 10 is overhead console. Alternatively, other in-vehicle illumination systems and the dimming control system 20 may be configured to coordinate with each other.

As described above, in the illumination presentation systems 100 and 100A according to the embodiment of the present disclosure, since the illumination control system 10 and the dimming control system 20 are automatically coordinated with each other, a special switch operation for forming a private space in the vehicle passenger compartment is unnecessary.

For example, when the surrounding environment is dark and the illumination control system 10 turns OD the vehicle interior illumination, since the dimming control system 20 can coordinate to automatically reduce the light transmittance of the window glass at the same time, it is possible to prevent the vehicle passenger compartment from being seen from outside the vehicle due to the influence of the vehicle interior illumination. In addition, since the light reflectance of the window glass increases at the same time, the vehicle 10 passenger compartment can be made brighter.

For example, when the illumination control system 10 presents hospitality to the occupant by the vehicle interior illumination, the dimming control system 20 can coordinate to automatically reduce the light transmittance of the window glass. This reduces the influence of disturbance light entering from outside the vehicle passenger compartment and enables more effective illumination presentation.

In addition, Since the illumination control system 10 and the dimming control system 20 are automatically coordinated with each other, the operations of both can be synchronized, Therefore, it is possible to accurately control a combination of a change in brightness in the vehicle interior illumination or illumination and a change in light transmittance of the window glass, and it is possible to improve the accuracy of the presentation.

In the case of the illumination presentation system 100 shown in FIG. 11, since the coordination of the dimming control system 20 is controlled by using the signal in the coordination signal line 16 output by the illumination control system 10, it is not necessary to change the operation or configuration of the master control unit 30 when it is necessary to add the coordination function. Therefore, the coordination control can be implemented without making major changes to the configuration and operation of the existing system.

The present disclosure is not limited to the above-described embodiments, and can be modified, improved, and the like as appropriate. In addition, materials, shapes, dimensions, numbers, arrangement positions or the like of elements in the embodiments described above are optional and are not limited as long as the present disclosure can be achieved.

According to a first aspect of the present disclosure, a vehicular illumination presentation system includes: a first control system (illumination control system 10) configured to control a vehicle interior illumination; a second control system (dimming control system 20) configured to control a dimming unit located in a predetermined portion in a region surrounding, a vehicle passenger compartment, the dimming unit being capable of adjusting a light transmittance; and a coordination control unit (shire control unit. 23a, or master control unit 30A) configured to coordinate an operation of the first control system and an operation of the second control system with each other.

According to the vehicular illumination presentation system of the first aspect, a plurality of systems automatically work in coordination with each other, so that it is possible to form a comfortable private space and perform effective presentation without the need 1 hr the occupant to perform any special manual operation.

According to a second aspect of the present disclosure, when the coordination control Unit (master control unit 30A) detects a predetermined private space presentation mode, the coordination control unit (master control unit: 30A) is configured to switch to a state where the dimming unit shields a visual disturbance environment, and to switch a state of the vehicle interior illumination (S22, S24, and S25).

According to the vehicular illumination presentation system of the second aspect, when the vehicle interior illumination is used, the dimming unit shields the visual disturbance environment, so that it is possible to prevent the influence of the disturbance light entering the vehicle passenger compartment from outside the vehicle. Therefore, it is possible to prevent a fluctuation in brightness of the vehicle passenger compartment when using illumination, and to control the illumination presentation in an easy-to-see state.

According to a third aspect of the present disclosure, when an illuminance in the vehicle passenger compartment is increased by the vehicle interior illumination in response to a decrease in an illuminance in an external environment the coordination control unit (master control unit 30A) is configured to switch to a state where the dimming unit shields a visual disturbance environment (S22, S24, and S25).

According to the vehicular illumination presentation system of the third aspect, when the surroundings are dark and the vehicle interior illumination is used, it is possible to automatically prevent the vehicle passenger compartment from being seen from outside the vehicle passenger compartment due to the influence of the illumination light in the vehicle passenger compartment. This makes it possible to maintain a comfortable private space in the vehicle passenger compartment.

According to a fourth aspect of the present disclosure, when the coordination control unit coordinates the operation of the first control system and the operation of the second control system, the coordination control unit is configured to synchronize a change in a light emission amount in the vehicle interior illumination and a change in the light transmittance of the dimming unit to simultaneously control the vehicle interior illumination and the dimming unit (S25, and S30).

According to the vehicular illumination presentation system of the fourth aspect, the change in light emission amount in the vehicle interior illumination and the change in light transmittance of the dimming unit are synchronized, so that it is possible to produce more effective presentation for the entire vehicle, and it is possible to perform presentation that changes smoothly with high accuracy.

According to a fifth aspect of the present disclosure, the dimming unit (dimming films 25R, and 25L) is installed at least to a window glass portion (dimming glass 24) of a vehicle.

According to the vehicular illumination presentation system of the fifth aspect, when the light transmittance at the window glass portion of the vehicle is adjusted, it is easy to provide a function of blindfolding other people outside the vehicle at night, and to isolate the space inside the vehicle from the outside of the vehicle such that the brightness in the vehicle passenger compartment is less influenced by the disturbance light.

According to the vehicular illumination presentation system of the present disclosure, it is possible to automate operations to form an appropriate private space in a vehicle passenger compartment or reduce required operations.

What is claimed is:

1. A vehicular illumination presentation system comprising:
   a first control system configured to control a vehicle interior illumination;
   a second control system, independent from the first control system, configured to control a dimming unit located in a predetermined portion in a region surrounding a vehicle passenger compartment, the dimming unit being capable of adjusting a light transmittance;

a coordination control unit configured to coordinate an operation of the first control system and an operation of the second control system with each other; and a coordination signal line connected to an output side of an illumination control unit of the first control system, wherein:

the illumination control unit outputs a signal indicating a current control state in the first control system to the coordination signal line;

a signal reflecting the control state of the illumination control unit is input to the second control system via the coordination signal line; and the coordination control unit is configured to coordinate an operation of the second control system based on a signal input from the output of the illumination control unit and an instruction from a master control unit which is a control unit having a rank higher than that of the first and second control system.

2. The vehicular illumination presentation system according to claim 1, wherein the dimming unit is installed at least to a window glass portion of a vehicle.

* * * * *